(12) United States Patent
Ephraim et al.

(10) Patent No.: US 7,200,387 B1
(45) Date of Patent: Apr. 3, 2007

(54) APPLICATION INVOCATION ON A MOBILE STATION USING MESSAGING SERVICE

(75) Inventors: Robert Martin Ephraim, Bridgewater, NJ (US); Ben-Ren Chen, Northborough, MA (US)

(73) Assignee: Cellco Partnership, Bedminster, NJ (US)

( * ) Notice: Subject to any disclaimer, the term of this patent is extended or adjusted under 35 U.S.C. 154(b) by 176 days.

(21) Appl. No.: 10/930,795

(22) Filed: Sep. 1, 2004

(51) Int. Cl.
H04M 3/00 (2006.01)

(52) U.S. Cl. ............... 455/418; 455/404.2; 455/412.1; 455/414.2; 455/419; 455/420; 455/456.1; 455/456.2; 455/456.3; 455/456.5; 455/456.6; 455/466

(58) Field of Classification Search ............. 455/404.2, 455/412.1, 414.2, 418, 419, 420, 456.1–457, 455/466, 521
See application file for complete search history.

(56) References Cited

U.S. PATENT DOCUMENTS

| | | |
|---|---|---|
| 4,654,879 A | 3/1987 | Goldman et al. |
| 4,700,374 A | 10/1987 | Bini |
| 5,193,215 A | 3/1993 | Olmer |
| 5,327,144 A | 7/1994 | Stilp et al. |
| 5,388,147 A * | 2/1995 | Grimes ..................... 455/404.2 |
| 5,479,482 A | 12/1995 | Grimes |
| 5,485,163 A | 1/1996 | Singer et al. |
| 5,542,100 A | 7/1996 | Hatakeyama |
| 5,577,103 A * | 11/1996 | Foti ......................... 455/412.1 |
| 5,592,180 A | 1/1997 | Yokev et al. |
| 5,596,330 A | 1/1997 | Yokev et al. |
| 5,604,921 A | 2/1997 | Alanara |
| 5,625,668 A | 4/1997 | Loomis et al. |
| 5,790,548 A | 8/1998 | Sistanizadeh et al. |
| 5,794,142 A * | 8/1998 | Vanttila et al. ............. 455/419 |
| 5,822,310 A | 10/1998 | Chennakeshu et al. |
| 5,822,700 A | 10/1998 | Hult et al. |
| 5,826,195 A | 10/1998 | Westerlage et al. |
| 5,835,907 A | 11/1998 | Newman |
| 6,075,783 A | 6/2000 | Voit |
| 6,104,711 A | 8/2000 | Voit |
| 6,421,707 B1 | 7/2002 | Miller et al. |
| 6,421,781 B1 | 7/2002 | Fox et al. |

(Continued)

OTHER PUBLICATIONS

Rajesh Bhalla, "'Push' Services Enabled Packet Data Network", Cisco Systems / Verizon Wireless, Mar. 6, 2001, pp. 1-9.

(Continued)

*Primary Examiner*—Steve M. D'Agosta
(74) *Attorney, Agent, or Firm*—McDermott Will & Emery LLP (57) ABSTRACT

Systems and methods for invoking location-based services on a mobile station are provided. An server receives an invocation request from a client entity. The server communicates the invocation request to a gateway, which generates the message for the destination mobile station and sends this message to a message center. The message includes parameters that identify one or more applications that are resident on the mobile station. The mobile station includes a receiver for receiving the message from the mobile communication network and a processor for invoking the identified applications by executing program code instructions that are configured to perform a location-based service or function. Further features, such as the passing of parameters to the invoked application, are also provided.

7 Claims, 4 Drawing Sheets

U.S. PATENT DOCUMENTS

| | | |
|---|---|---|
| 6,640,097 B2 | 10/2003 | Corrigan et al. |
| 6,643,506 B1 * | 11/2003 | Criss et al. ............... 455/419 |
| 6,654,786 B1 | 11/2003 | Fox et al. |
| 6,707,809 B1 | 3/2004 | Warrier et al. |
| 2001/0014085 A1 | 8/2001 | Johansson et al. |
| 2002/0068565 A1 | 6/2002 | Pumadi et al. |
| 2002/0186696 A1 | 12/2002 | Lim |
| 2003/0095540 A1 | 5/2003 | Mulligan et al. |
| 2003/0101329 A1 | 5/2003 | Lahti et al. |

OTHER PUBLICATIONS

"SMS Subparameters Enhancement", DDI Corporation (KDDI), cover page, pp. 1-6, C14-20010327-xxx.

Puneet Gupta, "Short Message Service: What, How and Where?" pp. 1-7, retrieved from internet on Jun. 8, 2004, <http://www.wirelessdevnet.com/channels/sms/features/sms.html>.

Jimmy LaMance, Javier DeSalas, Jani Jarvinen, "Assisted GPS: A Low-Infrastructure Approach", Mar. 1, 2002, pp. 1-5, GPS Worls, retrieved from the internet on Mar. 22, 2004 <http://www.gpsworld.com/gpsworld/content/printContentPopup.jsp?id=12287>.

* cited by examiner

APPLICATION INVOCATION ON A MOBILE STATION USING MESSAGING SERVICE

TECHNICAL FIELD

The present subject matter relates generally to location-based services for mobile communication networks, and more particularly, to the invocation and operation of mobile station-resident software applications using messaging services.

BACKGROUND

Mobile network operators or service providers are increasingly deploying location-based services (LBS) to add safety and convenience features to a mobile station's capabilities. Location-based services include applications that are designed to take advantage of knowledge about the physical location of the mobile station. One example of a location-based service is an enhanced emergency service (E911) that provides the physical location of the mobile station to an emergency response team.

The assisted global positioning system (aGPS) and other location capabilities that have been introduced into mobile stations for E911 can also be used to support a wide range of commercial location-based services. However, for commercial services, there are economic benefits that can be realized from an architecture that relies on Mobile Station (MS) resident functionality for control and security, rather than the more complex architecture used for E911 (i.e., an overlay network of mobile positioning systems).

Location-based services may be subscriber-initiated services, with the aGPS and other location capabilities of the mobile station being locally invoked by subscriber action at the mobile station (such as when a subscriber dials an emergency telephone number). The aGPS and other location capabilities of a mobile station may also be invoked by a network entity by sending a specially formatted text message (e.g., a short message service (SMS) message) to the mobile station.

One problem with this approach as currently practiced is that the network or other remote entities cannot invoke or trigger the execution of a particular location-based software application on a mobile station that may be configured to include several location-based software applications, which must be done if a significant portion of the functionality needed for location-based services is to be shifted from network entities to the mobile station.

What is needed is a method for selecting and invoking a particular location-based software application, resident in the mobile station, using a message passing architecture. What is further needed is a method for passing parameters to control the operation of applications that are executing on the mobile station.

SUMMARY

The concepts disclosed herein provide a technique for invoking a specific location-based service (LBS) or software application that is resident in a mobile station. An application server that is associated with a mobile communication network receives an invocation request from a client entity. The application server communicates the invocation request to a gateway, which generates the message for the destination mobile station and sends this message to a message center. The message identifies one or more applications that are resident on the mobile station and provides parameter values to control the operation of those applications. The mobile station includes a receiver for receiving the message from the mobile communication network and a processor for invoking the identified applications by executing program code instructions that are configured to perform a location-based service or function. Example LBS applications include map-based or "turn-by-turn" directions, nearby business locator, remote tracking of the mobile station, and advertising or coupon services.

In one aspect, a method for invoking a mobile station-resident location-based software application includes receiving a request at a server and generating a message including the application identifier that corresponds to the mobile-station resident location-based software application responsive to the request and provides parameter values to control the operation of that application. The method also includes sending the message to the mobile station to invoke the location-based software application based on the received application identifier and parameter values.

In another aspect, a method performed by the mobile station for invoking one of a plurality of location-based software applications includes receiving, at the mobile station, a message from the mobile communication network including the application identifier of the one application and parameter values to control the operation of that application, selecting the one application using the application identifier, and activating the selected location-based software application using the received parameter values.

A system for invoking a mobile station-resident location-based software application includes a server, a gateway, and a mobile switching center. The server is configured to receive a request from a client entity, such as a web server. The gateway generates a message including the application identifier and control parameter values for the location-based software application responsive to the server receiving the request. The mobile switching center sends the message to the mobile station to invoke the mobile station-resident location-based software application.

In a still further aspect, a mobile station including location-based software applications is provided. The mobile station includes a receiver and a processor. The receiver receives a message from a mobile communication network including the application identifier of one of the location-based software applications and parameter values to control the operation of that application. The processor selects one of the location-based software applications using the received application identifier and executes program code instructions corresponding to the selected location-based software application using the received control parameter values.

Further features of the disclosure, its nature and various advantages will be more apparent from the accompanying drawings and the following detailed description.

BRIEF DESCRIPTION OF THE DRAWINGS

The accompanying drawings illustrate several embodiments of the disclosure and, together with the description, serve to explain the principles of the disclosure.

DETAILED DESCRIPTION OF THE EMBODIMENTS

The present subject matter is now described more fully with reference to the accompanying figures, in which several embodiments are shown. The described concepts may be embodied in many different forms and should not be construed as limited to the embodiments set forth herein. Rather these embodiments are provided so that this disclosure will be thorough and complete and will fully convey the concepts to those skilled in the art.

One skilled in the art will recognize that methods, apparatus, systems, and data structures, and computer readable media implement the features, functionalities, or modes of usage described herein. For instance, an apparatus embodiment can perform the corresponding steps or acts of a method embodiment.

A. Overview

The concepts disclosed herein provide a technique for invoking a specific location-based service (LBS) or software application that is resident in a mobile station and provide control parameter values to control the operation of that application. For example, the mobile station may include a tracking application that determines the physical location of the mobile station and reports this information to a requester at predetermined time intervals. In one embodiment, the execution of the tracking application is invoked or triggered by a message (e.g., a short message service (SMS) text message) that is received by the mobile station. More specifically, the message represents a network-generated command that triggers program code that is resident on the mobile station to be executed in the mobile station runtime environment. Thus, as described herein, invoking an application on the mobile station may be defined as the triggering of mobile station-resident program code to be executed.

An application server receives LBS invocation requests from client entities. Example client entities include Internet web pages, mobile stations, and web services using simple object access protocol (SOAP) and the like. In an embodiment, the application server represents a server entity that provides or makes available an application to a client entity. For example, the application server may provide a hypertext markup language (HTML) interface for a human user or automated script that is used to form a LBS invocation request that can be directed to the mobile station of one or more subscribers. The application server communicates the invocation request to a gateway. The gateway then generates the message for the destination mobile station and sends this message to a message center. The message center performs a database query to obtain routing information to the destination mobile station. Based on the routing information, the message center sends the message to the mobile switching center that is currently serving the destination mobile station. The serving mobile switching center then forwards the message to the mobile station.

The message includes various parameters that the mobile station receives and parses. One parameter specifies which of the LBS applications that are resident or stored in the mobile station are to be invoked or executed by the station's processor. Other parameters may control the operation of the selected application. A mobile station may include several LBS applications, if the subscriber is interested in using a variety of different location-based services. Once invoked, the one or more LBS applications can communicate with network entities or other systems as required.

B. Example Data Flow

Figure 1:
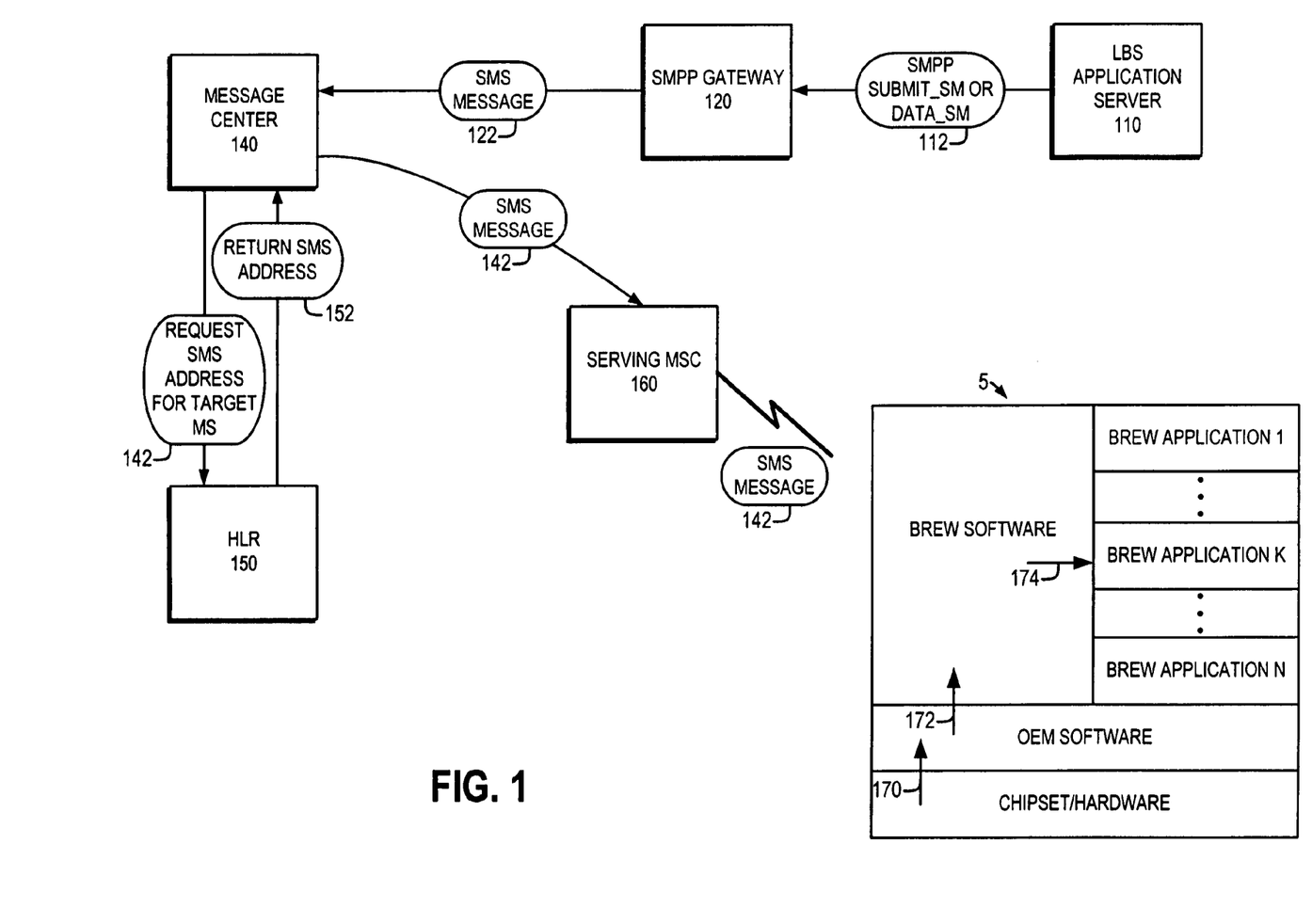
FIG. 1 is a diagram illustrating a message passing data flow according to an embodiment of the present disclosure.

FIG. 1 is a diagram illustrating a message passing data flow through a mobile communication network according to an embodiment of the present disclosure. The illustrated embodiment includes several mobile communication network entities, such as a location-based services (LBS) application server 110, a short message peer-to-peer protocol (SMPP) gateway 120, a message center 140, a home location register (HLR) 150, and a serving mobile switching center (MSC) 160. As one skilled in the art will appreciate, a mobile communication network may include additional system or network entities that are not specifically illustrated in FIG. 1 for clarity of the following description.

The illustrated embodiment also includes a functional abstraction layer view of a mobile station 5 that implements the binary runtime environment for wireless (BREW) software platform. (BREW is a registered trademark of Qualcomm Incorporated of San Diego, Calif.) Of course, other software environments, such as the Java 2 platform, micro edition (J2ME), may also be implemented. (JAVA is a registered trademark of Sun Microsystems, Inc. of Palo Alto, Calif.) In the illustrated embodiment, the mobile station 5 includes a plurality of BREW applications (designated as 1 . . . N). These BREW applications may be preloaded during manufacturing of the mobile station, installed by the service provider before or after provisioning the subscriber's account, or downloaded by the subscriber. For example, a subscriber that is interested in a restaurant locator application may elect to purchase the functionality (i.e., download the associated program code) from the service provider or other LBS application provider.

The plurality of BREW applications include application identifiers, such as a BREW CLASS ID. In one embodiment, an application identifier is uniquely associated with a single application. That is, each application that is resident in the mobile station 5 has a unique application identifier regardless of when the application is installed or downloaded into the mobile station 5.

In another embodiment, the service provider or LBS application provider may manage the relationship between the set of application identifiers and the associated set of LBS applications in order to maintain a coherent identification system.

The LBS application server 110 receives an invocation request from a client entity. Example client entities include Internet web pages, mobile stations, and web services using simple object access protocol (SOAP) and the like. Although it is not specifically illustrated, the LBS application server 110 can include a connection to an external network, such as the Internet. The LBS application server 110 may include a database or data structure for storing application identifiers and their associated LBS applications. The LBS application server 110 may also query another entity or database for a list of application identifiers associated with a destination mobile station 5. For example, the LBS application server 110 may request a list of applications that are resident in the mobile station 5 from the HLR 150. In response to an invocation request from a client entity to invoke a specific LBS application on a destination mobile station 5, the LBS application server 110 retrieves the requested application identifier from the database and performs a SUBMIT_SM or DATA_SM operation 112 in the SMPP protocol to send this information to the SMPP gateway 120. The SMPP gateway 120 performs a protocol conversion to generate a short message service (SMS)-compliant text message. Additional details relating to the messaging data structure are described below and with reference to FIG. 2.

The message is then sent 122 to the message center 140, which requests 142, from the HLR 150, routing information to the destination mobile station 5. In this embodiment, the HLR 150 represents a database that includes subscriber information such as directory number, electronic serial number of the mobile station 5, and the services/features the subscriber is assigned. The routing information includes an SMS address 142 for the target or destination mobile station.

The message center 140 then uses the routing information to direct the SMS message 142 to the appropriate serving MSC 160 depending on where the destination mobile station 5 is currently located within the network. The serving MSC 160 sends the message 142 to the mobile station 5.

Upon receipt of the message 142, the mobile station 5 first processes the message 142 at the chipset/hardware layer. The chipset/hardware layer decodes the data stream to distinguish the message 142 from other data, such as other control data or voice data. The message 142 passes 170 to the OEM software layer. The OEM software layer checks a portion of the message 142 for parameters that indicate a LBS service invocation. If the parameters are found, then the OEM software layer passes 172 the parameters to the BREW software, which parses the parameters into various fields, such as a set of general parameters and a set of application-specific parameters. The general parameters include the application identifier that is used to select a particular LBS application to execute.

In the illustrated embodiment, the BREW software matches 174 the application identifier with BREW application K and selects this application for execution by the processor of the mobile station 5.

The operation of the message passing data flow through the wireless mobile network may be further described by examples. In a first example, a human user that wishes to learn the location of a subscriber's mobile station 5 directs a web browser application to the Internet address of the LBS application server 110. In this example, the LBS application server 110 provides an HTML form having fields that require information from the user, such as the identity of the desired mobile station 5 and the desired LBS application. The user provides the subscriber's telephone number to identify the particular mobile station 5 and selects a tracking application as the desired LBS application. When the user selects a "submit" icon, the LBS application server 110 associates the selected tracking application with a predetermined application identifier (e.g., a data value of "100"). The submission of the HTML form represents a request by a human user to trigger the execution of an LBS application that is resident on the subscriber's mobile station 5.

The LBS application server 110 sends the application identifier and other parameters to the SMPP gateway 120 using a SUBMIT_SM or DATA_SM construct. The SMPP gateway 120 generates an SMS message 122 using the received data. The SMS message 122 is communicated to the message center 140, which routes the SMS message to the appropriate serving MSC 160. The serving MSC 160 communicates the SMS message 142 to the mobile station 5. The mobile station 5 then parses the incoming SMS message 142 and triggers the execution of the tracking application.

After the tracking application has obtained a location fix (e.g., the latitude and longitude of the mobile station 5), the location fix is communicated to the LBS application server 110 using a return SMS message or bearer data service. The LBS application server 110 displays the location fix to the user in an HTML web page.

In a second example, the subscriber or user of the mobile station 5 triggers the invocation of a mobile station-resident LBS application. A web browser application running on the mobile station 5 displays content retrieved from the Internet. The web browser application also displays hyperlinks that can be selected by the user. A hyperlink can direct the web browser application to another web page.

In this example, the user selects a hyperlink for finding a close restaurant. Although a restaurant locator LBS application resides on the mobile station 5, the selection of the hyperlink does not trigger the execution or invocation of this LBS application. As a matter of privacy policy, hyperlinks often do not directly invoke mobile station-resident functionality, such as LBS applications. Therefore, when the user selects the restaurant locator hyperlink, the web browser is redirected to the LBS application server 110. More specifically, the web browser application generates an invocation request to the LBS application server 110 in the form of a uniform resource identifier (URI) string. The URI includes the application identifier that corresponds with the restaurant locator LBS application.

The LBS application server 110 parses the URI string and sends a SUBMIT_SM or DATA_SM construct to the SMPP gateway 120. The SMPP gateway 120 generates an SMS message 122 using the received data. The SMS message 122 is communicated to the message center 140, which routes the SMS message to the appropriate serving MSC 160. The serving MSC 160 communicates the SMS message 142 to the mobile station 5. The mobile station 5 then parses the incoming SMS message 142 and triggers the execution of the restaurant locator LBS application.

The restaurant locator LBS application performs a location fix and communicates the location information to a server using a bearer data channel. The server, which is provided by a third-party on the Internet, provides a list of nearby restaurants, which is displayed on the mobile station 5.

C. Data Structure

Figure 2:
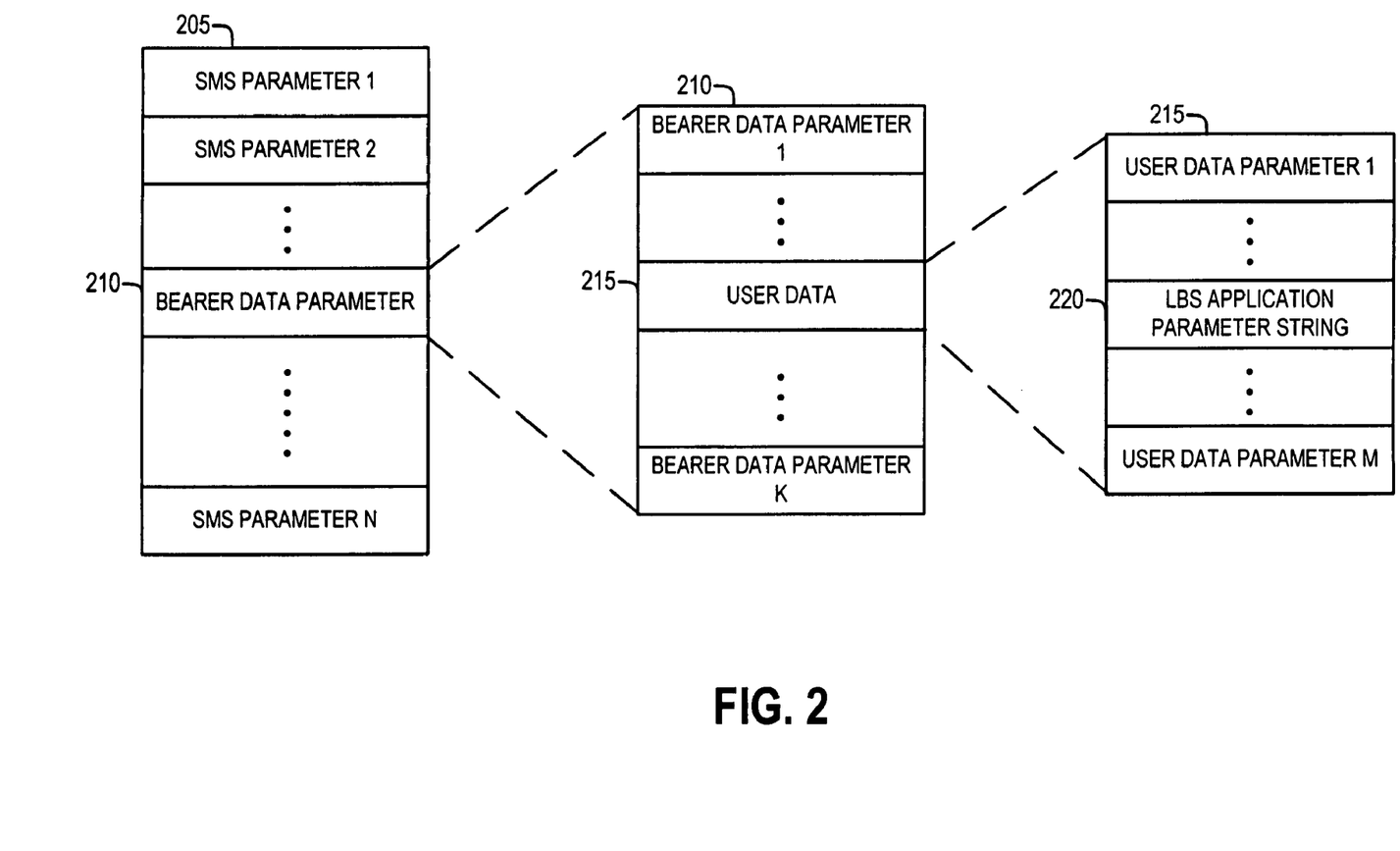
FIG. 2 is a diagram illustrating a messaging data structure according to an embodiment of the present disclosure.

FIG. 2 is a diagram illustrating a messaging data structure according to an embodiment of the present disclosure. In the illustrated embodiment, a 160 octet SMS message 205 is shown that includes SMS parameter fields 1 to N. One of the parameter fields represents a bearer data parameter 210. The bearer data parameter 210 may be logically viewed as containing bearer data parameter fields 1 to K. One of the bearer data parameters represents user data 215. The user data 215 includes user data parameter fields 1 to M. One of the user data parameter fields represents an LBS application parameter string 220.

The LBS application parameter string 220 includes the general and application-specific parameters that are used by the mobile station 5 to invoke a particular one of a plurality of LBS software applications. Application specific parameters may, for instance, be used to control the presentation of information to the mobile station user. For instance, for a location based application that uses the mobile station's graphical display to present information, an application specific parameter can be used to select the color scheme to be used for that display. This could allow one color scheme to be used for the display of information to normally sighted users and a different color scheme to be used to display information to users having different forms of color blindness. Furthermore, for an application that provides audible, turn-by-turn driving instructions to the mobile station user, an application specific parameter might be used to determine the language to be used for the audible instructions. As described above, the OEM layer of the mobile station 5 identifies a non-null portion of the LBS application parameter string 220 to determine whether to invoke an LBS application session.

As one skilled in the art will appreciate, there are several variants of the use SMS messaging to invoke the assisted GPS capabilities within the mobile station 5 (e.g., the use of a specific teleservice ID and the use of a unique character string at the start of the user data). The service invocation and parameter passing techniques described herein may be used with any of these variants.

More specifically, the LBS application parameter string 220 may be used to transport from the LBS application server 110 to the mobile station 5 any data values needed to invoke an LBS application that is resident in the mobile station 5 as well as pass operational parameters to the invoked LBS application. Table 1 illustrates an example set of general parameters that may be included in the LBS application parameter string 220. Of course, each of the parameters listed in Table 1 may not be needed for a particular LBS application.

TABLE 1

| Parameter | Description |
| --- | --- |
| Application ID | Identifies the mobile station-resident specific LBS application to be invoked. In the case that the MS resident LBS applications are BREW applications, this may be the BREW CLASS ID. |
| Target MDN | Provides the phone number of the mobile station. |
| Requestor ID | Identifies the LBS client that requested that the mobile station be located. |
| Per Request Permission Required Flag | Controls whether the mobile station notifies the mobile station user and gives the user the opportunity to block the LBS service invocation. |
| GPS vs. Cell ID Flag | Indicates whether the requested location fix(es) shall provide GPS-based fix(es), or whether the requested fix(es) shall provide Cell ID value(s). |
| Fix Interval (in minutes) | Defines the frequency with which the mobile station performs a location fix. |
| Polling Interval | Controls the frequency with which the mobile station reports its location fix(es). Depending on the Fix Interval and the Polling Interval, the mobile station may send the results of a single fix each time it reports, or it may send the stored results of several fixes when it reports. (Network load can be reduced by allowing the mobile station to accumulate the results of several fixes and including them all in a single report.) |
| Tracking Period | Controls the duration of the interval of time for which the invoked LBS application is to remain active. Taken in combination with the Fix Interval, this also determines the total number of requested location fixes. |

In addition to the general parameters listed in Table 1, for certain LBS applications, there may be a need to pass certain application-specific parameters. These can be passed using the same method (i.e., by including a field in the user data field 220 within the bearer data field 210 of a SMS message 205 to carry the value of each of the application-specific parameters.) In one embodiment, the application-specific parameters are included in the LBS application parameter string 220.

In a preferred embodiment, the LBS application parameter string 220 is a text segment that is structured as a sequence of semicolon separated fields, in which each field contains the value of the parameter assigned to that point in the sequence. For example, if there are no application-specific parameter values to convey, the LBS application parameter string 220 may be in the following format:

Application_ID_value;Target_MDN_value;Requestor_I-
D_value;Per_Request_Permission_Required_
Flag_value; GPS_vs.
_Cell_ID_Flag_value;Fix_Interval_value;Polling_Inter-
val_value;Tracking_Period_value As another example, if there are two application-specific parameters to pass, AppParm1 and AppParm2, the LBS application parameter string 220 may be in the following format:

Application_ID_value;Target_MDN_value;Requestor_I-
D_value;Per_Request_Permission_Required_
Flag_value; GPS_vs._Cell_ID_Flag_value;Fix_Inter-
val_value;Polling_Interval_value;Tracking_Period_
value;AppParm1_value;A ppParm2_value In one embodiment, when a value is not needed for one or more of the parameters that may be passed to the LBS application, the value may be omitted but the associated semicolons are not omitted.

D. Block Diagrams

The network entities illustrated in FIG. 1 (e.g., the LBS application server 110) may utilize any appropriate hardware for the client and server systems. It is presumed that readers are familiar with the structure and operation of these various electronic devices. However, for completeness, a summary description is provided below for an exemplary mobile telephone device and for a general purpose computer.

Figure 3A:
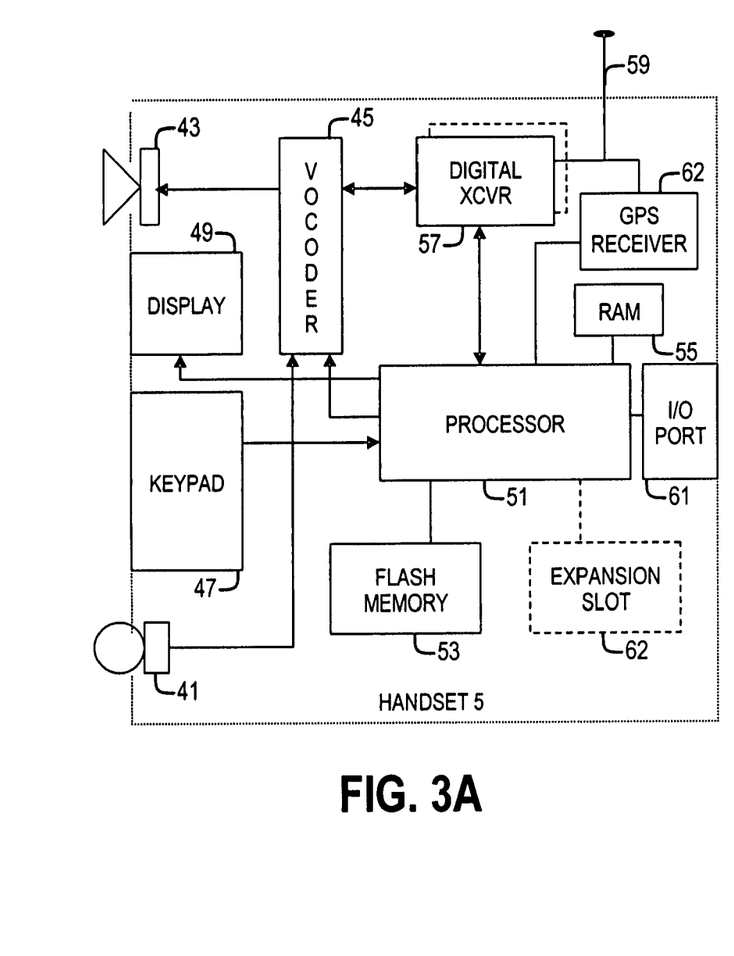
FIG. 3A is a block diagram of an exemplary mobile station.
Figure 3B:
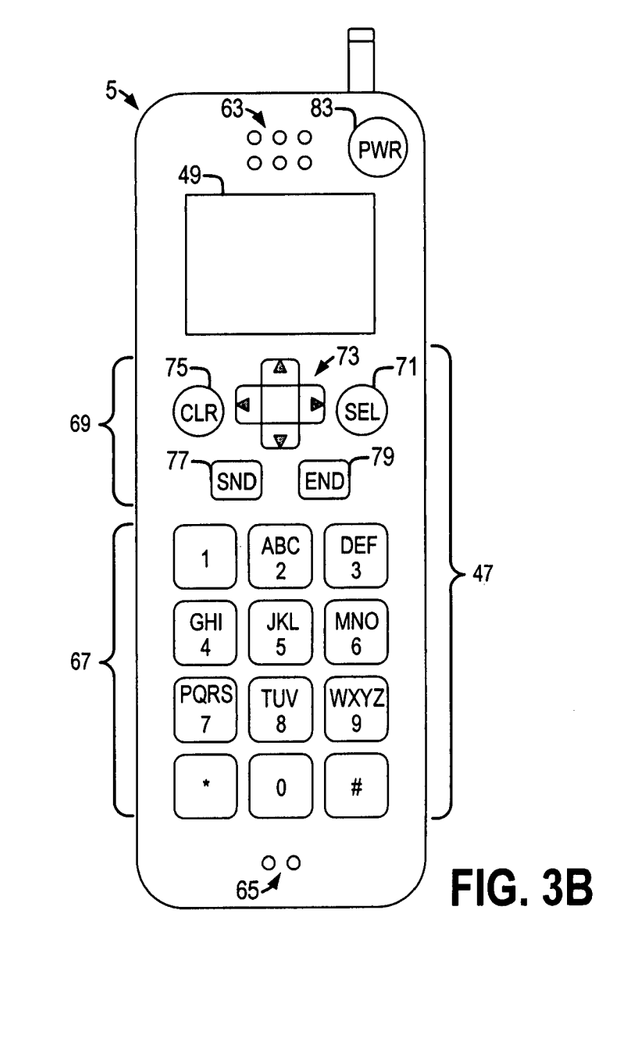
FIG. 3B illustrates a user interface for an exemplary mobile station.

FIG. 3A is a functional block diagram of a simple mobile communication device or mobile station 5 for use in the network of FIG. 1, and FIG. 3B is a plan view of the front of one exemplary embodiment of such a device. Although the mobile station 5 may be incorporated into a vehicle mounted mobile unit or into another device, such as a PDA or a portable personal computer, for clarity of the description the illustration shows the mobile station 5 in the form of a handset.

The mobile station 5 functions as a conventional digital radiotelephone. For that function, the mobile station 5 includes a microphone 41 for audio signal input and a speaker 43 for audio signal output. The microphone 41 and speaker 43 connect to voice coding and decoding circuitry (vocoder) 45. For a voice telephone call, for example, the vocoder 45 provides two-way conversion between analog audio signals representing speech or other audio and digital samples at a compressed bit rate compatible with the digital protocol of the wireless telephone network communications.

For digital wireless communications, the handset 5 also includes a digital transceiver (XCVR) 57. The present disclosure encompasses embodiments utilizing any digital transceivers that conform to current or future developed digital wireless communication standards. For example, the transceiver 57 could be a TDMA or GSM unit, designed for cellular or PCS operation. In a preferred embodiment, the digital transceiver 57 is a CDMA transceiver that complies with the IS-95 standard, the 1xRTT (radio transmission technology) standard, or the EVDO (evolution data only) standard and is capable of operating via the network of FIG. 1. The transceiver 57 provides two-way wireless communication of information, such as vocoded speech samples and digital message information. The transceiver 57 connects through RF send and receive amplifiers (not separately shown) to an antenna 59. The mobile station 5 may include one or more additional transceivers, as shown in dotted line form, for operation in an analog mode, additional digital modes.

In the illustrated embodiment, the mobile station 5 also includes a global positioning system (GPS) receiver 62. The GPS receiver 62 is used to acquire and receive geographical position signals from a set of at least three satellites. The GPS receiver 62 may be conventional application specific integrated circuits (ASICs) such as the PMB 2500 and PMB 3330 chipset, which are commercially available from Infineon Technologies AG of Munich, Germany. As one skilled in the art will appreciate, in another embodiment, the functionality of the GPS receiver 62 or other functional blocks illustrated in FIG. 3 may be combined into fewer integrated circuits or divided into more integrated circuits or other hardware.

As shown, the mobile station 5 includes a display 49 for displaying messages, a menu generated by a client browser program, call related information, dialed and calling party numbers, etc. For the some services involving packet data communication, the display 49 may also display application elements, such as e-mail mailboxes and messages, web pages, and the like. A keypad 47 enables dialing digits for voice and/or data calls and generating selection inputs keyed by the user based on displayed menu. The display and keypad may also offer a "point and click" functionality, for example, to select links from displayed web pages. The selection of links from web pages can generate a request to the LBS application server 110 to invoke a particular LBS application.

A microprocessor 51 controls the operations of the mobile station 5. The microprocessor 51 is a programmable device. The mobile station 5 also includes a flash memory 53 alone or in combination with a read only memory (ROM) and/or a non-volatile random access memory (RAM) 55, for storing various software routines and mobile configuration settings, such as mobile identification number (MIN), etc. For example, the flash memory 53 can be used to store LBS applications. When stored in the flash memory 53 or RAM 55, these applications are considered resident in the mobile station. The random access memory RAM 55 stores an operating system, vocoder software, client browser software, device driver software, call processing software, SMS software, LBS applications, and the like. The memories also store data, such as telephone numbers and other data input by the user via the keypad 47. The handset 5 may also include an optional expansion slot, to add memory elements or to add other user selected functional elements.

FIG. 3B shows the front of the cellular mobile station 5, in the form of a portable handset. As shown, the handset housing includes openings 63 enabling sound to emerge from the speaker 43, as well as openings 65 to allow input of sound to the microphone 41.

The mobile station 5 includes the visible display screen 39. The handset 5 also includes various keys making up the keypad 47. The keypad 47 typically includes at least two sets of keys 67, 69. The first set of keys 67 represent twelve dialing-input keys. Typically, each of the keys 67 is imprinted with a number from "1" to "0," asterisk, and pound. Each of the keys 67 numbered 2 through 9 also is imprinted with three or four letters, to enable input of alphabetical information.

The second set of keys 69 are function keys. The exemplary set of function keys include a menu scrolling key 73, a selection (SEL) key 71, a clear (CLR) entry key 75, a send (SND) key 77 and an END key 79. The send (SND) key 77 is used to initiate or answer a wireless call, and the "END" key 79 is used to terminate a wireless call.

Although other keys with other functions and/or labels may be used in place of or in addition to those shown, FIG. 3B shows three function keys for input of information to and retrieval of information from the processor and memory of the handset and/or selection of features from a menu shown on the display 49. One of these keys is the two-way scrolling key 73, for controlling up and down movement of a displayed cursor or highlight function and attendant scrolling of menus shown on the display 49. The exemplary keys also include the selection (SEL) key 67, which enables a user to select an option indicated by the cursor or highlighting. The clear (CLR) key 69 enables the user to erase a selection. As one skilled in the art will appreciate, a wide variety of other cursor controls and selection inputs can be used. The user operates a power (Pwr) key 83 to toggle the handset 5 on and off.

The keypad 47 supplies user input information to the processor 51, and the processor 51 provides digital data signals to cause the display to show appropriate information to the user. Under control of the processor 51, the display 49 shows textual information, such as dialed numbers and name and number information regarding stored speed dialing lists. The display 49 also may have certain specialized indicators, such as a message-waiting indicator and various roaming or home service indicators. Hence, under control of the processor 51 and its programming, the keypad 47 and the display 49 provide a user interface allowing the customer to input information and receive information.

To make a routine telephone call, for example, a user dials in the destination number by actuating the appropriate ones of the number keys 67 and then pushes the send (SND) key 77. As the user presses the number keys, the processor 51 causes the screen 49 to display the dialed number. When it senses the actuation of the send (SND) key 77, the processor 51 generates a call request message in the appropriate protocol. This message includes the dialed destination number. The processor 51 causes the digital transceiver 57 to send the message, as a signaling message, for example over the signaling channel of the particular wireless air interface to a base station, for call setup processing by the network.

The user interface through the keypad 47 and the display 49 also allow the user to input and receive data, which the mobile station 5 may communicate through the network using the digital transceiver 57. The mobile station 5 also includes an input/output port 61 coupled to the processor 51, to allow for exchange of data between the processor 51 and an external data device. Through this port, the mobile station 5 may serve as a data modem for an attached device, such as a laptop computer or a personal digital assistant. As a result, the mobile station 5 can provide mobile access to packet data communications services available from the wireless network.

Figure 4:
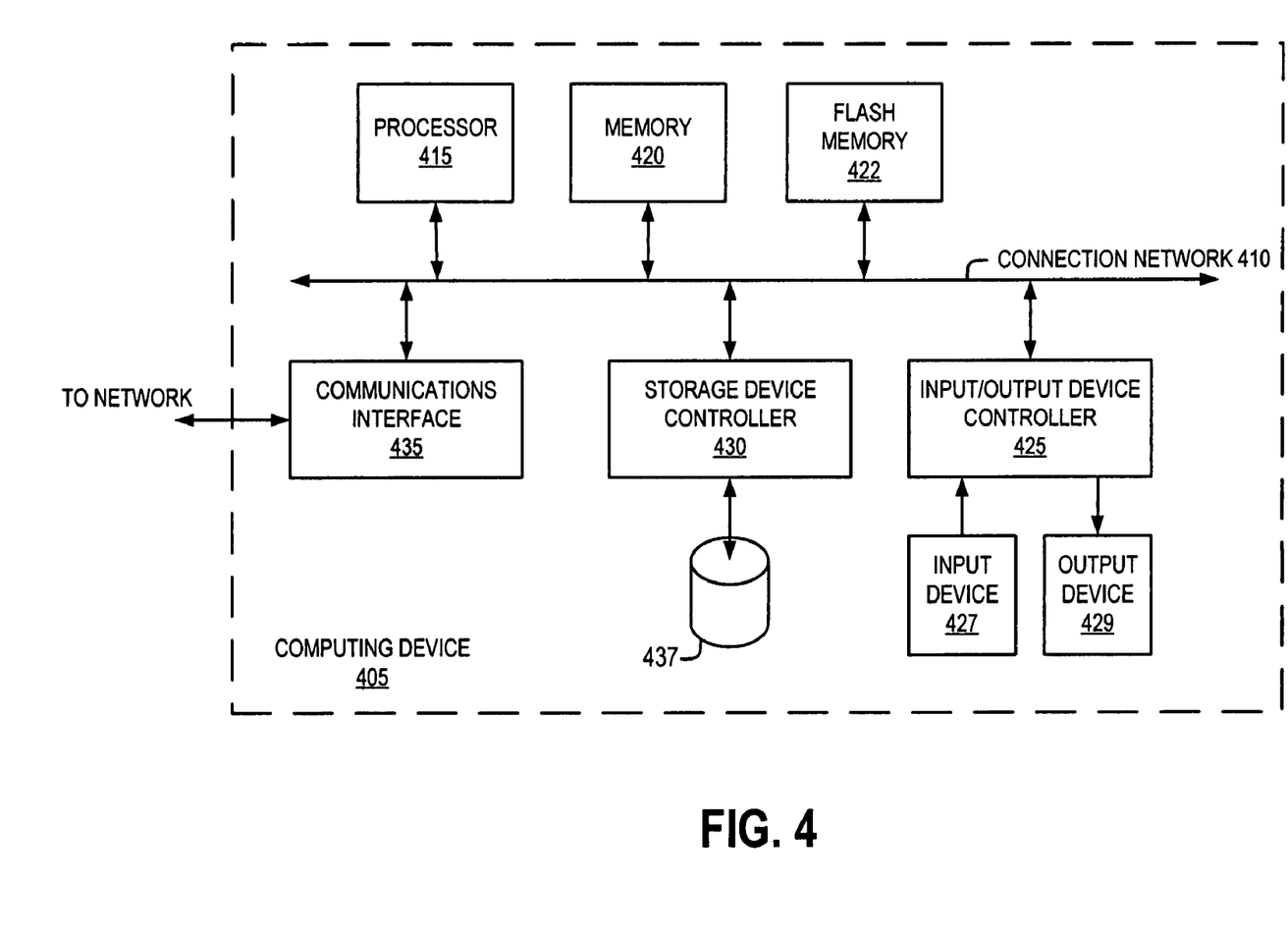
FIG. 4 is a block diagram of an exemplary computing device.

FIG. 4 is a block diagram of an exemplary network entity, such as the LBS application server 110. As described above, the features or functions of network entities may be implemented using one or more computing devices. In the illustrated embodiment, the computing device 405 includes an internal connection network 410, a processor 415, a memory 420, a flash memory 422, an input/output device controller 425, an input device 427, an output device 429, a storage device controller 430, a communications interface 435, and a storage device 437.

The connection network 410 operatively couples each of the processor 415, the memory 420, the flash memory 422, the input/output device controller 425, the storage device controller 430, and the communications interface 435. The connection network 410 can be an electrical bus, switch fabric, or other suitable interconnection system.

The processor 415 is a conventional microprocessor. The processor 415 executes instructions or program code modules from the memory 420 or the flash memory 422. The operation of the computing device 405 is programmable and configured by the program code modules. Such instructions may be read into memory 420 or the flash memory 422 from a computer readable medium, such as a device coupled to the storage device controller 430.

Execution of the sequences of instructions contained in the memory 420 or the flash memory 422 cause the processor 415 to execute application components, servlets, or otherwise perform the methods or functions described herein. In alternative embodiments, hardwired circuitry may be used in place of or in combination with software instructions to implement aspects of the disclosure. Thus, embodiments of the disclosure are not limited to any specific combination of hardware circuitry and software. The memory 420 can be, for example, one or more conventional random access memory (RAM) devices. The flash memory 422 can be one or more conventional flash RAM, or electronically erasable programmable read only memory (EEPROM) devices. The memory 420 may also be used for storing temporary variables or other intermediate information during execution of instructions by processor 415.

In one embodiment, the flash memory 422 includes program code modules and user data. The program instructions associated with the program code modules are communicated to the processor 415 via the connection network 410. Program instructions may be executed directly from the flash memory 422 or communicated to the memory 420 before execution by the processor 415.

The input/output device controller 425 provides an interface to the input device 427 and the output device 429. The output device 429 can be, for example, a conventional display screen. The display screen can include associated hardware, software, or other devices that are needed to generate a screen display. The illustrated embodiment also includes an input device 427 operatively coupled to the input/output device controller 425. The input device 427 can be, for example, an external or integrated keyboard or cursor control pad.

The storage device controller 430 can be used to interface the processor 415 to various memory or storage devices. In the illustrated embodiment, a storage device 437 is shown for storing software applications, network parameters, user data, system configuration, databases, and the like. As one skilled in the art will appreciate, the storage device 437 can be any suitable storage medium, such as magnetic, optical, or electrical storage.

The communications interface 435 provides bidirectional data communication coupling for the computing device 405. The communications interface 435 can be functionally coupled to an external network (not specifically illustrated in FIG. 4). In one embodiment, the communications interface 435 provides one or more input/output ports for receiving electrical, radio frequency, or optical signals and converts signals received on the port(s) to a format suitable for transmission on the internal connection network 410. The communications interface 435 can include a radio frequency modem and other logic associated with sending and receiving wireless or wireline communications. For example, the communications interface 435 can provide an Ethernet interface, Bluetooth, and/or 802.11 wireless capability for the computing device 405. In an implementation in which the computing device 405 is configured to perform the functionality of the LBS application server 110, the communications interface 435 is typically an Ethernet interface.

Having described embodiments of application invocation on a mobile station using messaging service (which are intended to be illustrative and not limiting), it is noted that modifications and variations can be made by persons skilled in the art in light of the above teachings. It is therefore to be understood that changes may be made in the particular embodiments disclosed that are within the scope and spirit of the invention as defined by the appended claims and equivalents.

What is claimed is:

1. A method for invoking one of a plurality of mobile station-resident location-based software applications, the method comprising:
   receiving a request at a server;
   requesting, by the server, a list of application identifiers for the location-based software applications resident on the mobile station;
   generating a message including an application identifier corresponding to one of the plurality of the mobile station-resident location-based software applications responsive to the request; and
   sending the message to the mobile station to invoke the one of the plurality of mobile station-resident location-based software applications based on the received application identifier.

2. A mobile station for wireless communication via a mobile communication network, the mobile station comprising:
   a wireless transceiver for sending and receiving signals over a wireless air interface to and from the mobile communication network;
   a processor coupled to the wireless transceiver for controlling communications of the mobile station via the wireless transceiver;
   a program memory coupled to the processor; and
   executable programming stored in the program memory for execution by the processor, the stored programming including an application execution platform and one or more applications for execution by the processor via the platform, each application being selectable by an application identifier, wherein:
   the processor is configured to respond to receipt of a message via the transceiver containing an application identifier identifying an application for a location-based service among the one or more applications stored in the program memory by selecting and executing the stored location-based service application identified by the application identifier included in the received message, and to generate information as a result of the execution of the identified location-based service application and send a message including the information generated as the result of the execution of the identified location-based service application via the transceiver;
   the executable programming includes an OEM software layer for processing message data received via the transceiver;
   the OEM software layer passes data from the received message to the application execution platform;
   the data passed to the application execution platform includes the application identifier included in the received message; and
   the data passed to the application execution platform further includes at least one operational parameter for use by the identified location-based service application during execution.

3. The mobile station as in claim 2, wherein the application execution platform comprises a binary runtime environment for wireless (BREW) software platform or a Java 2 software platform, micro edition (J2ME).

4. A method of providing a location-based service, comprising:
- receiving, from a client entity, a request related to the location-based service regarding a mobile station at an application server associated with a mobile communication network;
- sending a software application invocation message from the server to the mobile station through the mobile communication network,
- wherein the software application invocation message includes an application identifier for identifying a stored executable software application for the location-based service from among a plurality of executable software applications stored in the mobile station;
- receiving a message from the mobile station through the mobile communication network, containing data generated by execution of the identified stored executable software application for the location-based service by the mobile station; and
- providing to the client entity, a response to the received request, based at least in part of the data contained in the message received from the mobile station wherein:
- the software application invocation message sent from the server to the mobile station further includes at least one parameter value for a set of operational parameters for processing during execution of the identified stored executable software application;
- the software application invocation message comprises a user data field;
- the user data field contains a parameter string including the application identifier and the at least one operational parameter;
- the parameter string includes a set of general parameters and a set of application-specific parameters; and
- the set of general parameters includes at least one of the application identifier, an identifier of the mobile station, a requestor identifier, a permission flag, a GPS flag, a location fix interval, a polling interval, and a tracking period.

5. The method of claim 4, wherein the client entity is a device associated with an external network.

6. The method of claim 4, wherein the client entity is the mobile station.

7. The method of claim 4, wherein the request comprises a simple object access protocol request.

* * * * *